FIP8411    OR    2,279,703

Patented Apr. 14, 1942

2,279,703

UNITED STATES PATENT OFFICE 2,279,703

CATALYTIC CONVERSION OF HYDROCARBONS

William E. Bradley and John L. Volz, Los Angeles, Calif., assignors to Union Oil Company of California, Los Angeles, Calif., a corporation of California No Drawing. Application January 18, 1938, Serial No. 185,543

13 Claims. (Cl. 196—50)

This invention relates to the use of catalysts containing copper oxide useful in effecting conversion of hydrocarbons. It further relates to processes for the catalytic conversion of the hydrocarbons in which said catalysts containing copper oxide are used.

Hydrocarbon conversion is effected by numerous reactions such as dehydrogenation, hydrogenation, molecular rearrangement, alkylation, polymerization, and the like. Such conversions as are effected by heat alone are widely used in the petroleum industry in such forms as reforming of gasolines, and dehydrogenation of normally gaseous hydorcarbons. Straight pyrolysis, however, suffers the defect that the reactions are not controlled and that the yields of the desired products are often very low. Suitable catalysis makes possible efficient promotion and guidance of such reactions, but even when an effective catalyst is found its use will not be efficient unless it displays the normally rare quality of combining high activity, long life, immunity to poisoning, ease of regeneration, and moderate cost. The present invention is concerned more particularly with the use of a catalyst in the dehydrogenation of normally gaseous paraffinic hydrocarbons heavier than methane, and in reforming gasoline hydrocarbons such as paraffines and naphthenes to produce hydrocarbons of higher anti-knock value such as aromatics and unsaturates. It is further concerned with the dehydrogenation in general of non-benzenoid hydrocarbons heavier than methane.

It is an object of the present invention to use a highly active catalyst containing copper oxide. It is a further object to use such a catalyst which is highly active, has a long life, is not easily poisoned and is easily regenerated. It is a still further object of the invention to use such a catalyst in hydrocarbon conversions such as dehydrogenation and reforming, and also hydrogenation.

Broadly stated the invention resides in the use of highly active catalysts containing copper oxide supported on a distending gel. The invention further resides in the use of catalysts comprising copper oxide and oxides of metals forming difficultly reducible oxides especially where such oxides are those of zirconium, thorium and aluminum. The invention further resides in the use in such catalysts of promoting or activating agents in the form of metallic oxides more especially where such promoting agents are the oxides of the alkali earths.

The invention further resides in a process for the hydrogenation, dehydrogenation or reforming of hydrocarbons which comprises contacting the vapors of said hydrocarbons with such catalysts at elevated temperatures.

In this specification and the appended claims we use the term "hydroxide" to designate that type of compound obtained by precipitation with an alkaline precipitant or its equivalent without regard to whether the precipitated compound is a fully hydroxy compound or a hydroxy-oxy compound. We use the term "oxide" widely, and it embraces the dehydration product of the hydroxide as obtained by the herein described process of manufacture and use, without regard to the exact degree of dehydration. The term "oxide" thus may or may not embrace a hydrous oxide, depending on the ease with which the particular compound loses all of its water.

We have found that the catalytic activity of copper oxide in dehydrogenation reactions is markedly affected by the physical condition of the copper oxide and we have found further that copper oxide co-precipitated or otherwise incorporated with an oxide gel especially where such oxide gels are those of zirconium, aluminum and thorium possess greatly increased catalytic activity in reactions of this type. We have furthermore found that the inclusion of alkaline earth oxides such as barium oxide in such a hydrous oxide-copper oxide catalyst promotes the activity of the catalyst and lengthens its life, possibly by protecting the copper oxide against reduction to the metallic form.

The oxide gels are preferably prepared by precipitation of the hydroxide by means of an alkaline precipitant or its equivalent and then drying and dehydrating the gelatinous hydroxide precipitate in such a way as to conserve or enhance its highly porous distended gel structure. The hydroxide precipitation may be effected by the addition of an alkali or ammonium hydroxide to a solution of water soluble salt of the metal concerned, or, in the case of an amphoteric metal, by the addition of an acid or acid reacting substance to the alkaline solution of the acidic oxide of the metal.

The copper is preferably incorporated in the distender while the latter is in the hydroxide stage. Such incorporation may suitably take place by adsorption, or by co-precipitation of all the components as hydroxides, or by successive precipitation, e. g. precipitation of the distenders as the hydroxide and suspension of this precipitate in an aqueous solution of a copper salt prior to further addition of an alkaline precipitant.

In at least some instances we may prepare the catalyst in suitable gel form by metathesis between the water soluble salts of the components, as for instance by mixing an alkaline solution of an amphoteric distender with a solution of the nitrates of copper and the other components, if any.

The copper and other components may also be introduced as oxalates or carbonates or in the form of other insoluble salts which decompose on heating to form the oxide. Thus the precipitated hydroxide distender can be stirred into a solution of copper and barium nitrate and ammonium oxalate added to this mixture to precipitate the copper and barium on the distender.

Compounds of the promoter may be introduced along with the copper, particularly where an oxalate or carbonate precipitation of the latter is employed. They may also be introduced with the copper when it is desired to precipitate the copper with a hydroxide, but unless the hydroxide of the promoter is relatively insoluble this method of incorporation depends largely on adsorption. In the case of barium nitrate 25% or more of the barium in solution may be thus adsorbed. Again the promoter may be adsorbed on a mixture of precipitated copper and distender hydroxides by stirring the latter into a concentrated solution of a water soluble compound of the promoter, e. g. $Ba(NO_3)_2$ or $Ba(OH)_2$, and filtering off the excess liquid. The adsorbed barium nitrate is subsequently converted into the oxide by heating as hereinafter described.

It is usually desirable to wash all precipitates free of water-soluble electrolytes following their precipitation. If a water-soluble component has been introduced into the catalyst by adsorption, such washing may be dispensed with, or at least diminished in order to retain the desired quantity of adsorbed material in the catalyst.

After the moist catalyst has been prepared, it is suitably compacted, as by filtration on a vacuum filter, and the cake thus formed dried for several days at 100° to 150° F. The dry gel thus obtained is then heated in a stream of dry air at 500° to 700° F. to decompose any nitrates and to effect further dehydration, whereby a vitreous gel of high porosity and good physical strength is obtained. The catalyst may be used at this stage, but usually we find it preferable to subject the catalyst to an atmosphere of hydrogen at the temperature of intended use before contacting it with hydrocarbon vapors.

The temperature of dehydration may be varied widely without detriment to its activity provided that the catalyst is not heated hot enough to impair its structure. Exposure to white heat, for example, shrinks the volume of the gel, removes the last traces of water, and whether by virtue of these or other effects greatly reduces the activity of the catalyst. Prolonged exposure at high temperatures somewhat less than white heat, around 1200° F. for example, also tends to impair the structure of the catalyst.

For purposes of illustration there are presented the following examples of the preparation of our catalysts:

*Catalyst 1.*—¼ mole of zirconium oxy-chloride was dissolved in 5000 ml. of distilled water to obtain a solution from which zirconium hydroxide was precipitated by the addition of a slight excess of 9% aqueous ammonia. After the precipitate had been thoroughly washed with distilled water, 83 ml. of a copper nitrate solution containing ¼ mole of copper nitrate and 6.5 grams of barium nitrate (¹⁄₄₀ mole) was added and the volume of the mixture adjusted to approximately 2000 ml. by the addition of distilled water. This suspension was heated to boiling and while boiling vigorously just sufficient 9% ammonia solution was added to precipitate the copper. The resultant mixed precipitate was then washed with distilled water and formed into a cake on a suction filter. This cake was dried for several days in an oven at 100° to 150° F., to convert it into a gel of good mechanical strength. This gel was broken up and screened to 10 to 20 mesh particles, and the particles then heated to 600° F. in a current of dry air, whereby a black vitreous gel was obtained.

This catalyst was then reduced with hydrogen at 850° F. over a period of 16 hours. This temperature was reached by gradually heating the catalyst to avoid disintegration of the physical structure and during this interval of temperature rise and for some time afterwards at 850° F. some water was lost from the catalyst. This step thus accomplished further dehydration of the catalyst and also reduced the catalyst insofar as it was reducible at 850° F. and at atmospheric pressure.

At the end of the reduction period gasoline vapors carried by two volumes of hydrogen gas were passed over the catalyst at 850° F. using a contact time of about three seconds. The gasoline used was a raffinate from a sulphur dioxide extraction process and had the following characteristics: A gravity at 60° F. of 55.7° API; Engler distillation, initial 170° F., maximum 380° F., average boiling point 267° F.; sulphur content 0.004% by weight; refractive index n/D, 1.4155; absorption in 99% sulphuric acid, 1% by volume. A hydrocarbon analysis based on aniline point determinations indicated on a weight basis; 0% unsaturates; 1% aromatics; 46.7% naphthenes; and 52.3% paraffines.

The initial condensate contained 6.3% more aromatics than the gasoline feed contained, as determined by the change in refractive index. A substantial portion of unsaturates was also present. After five hours operation at 850° F. a 7.5% conversion to aromatics was being obtained.

After six hours use at 850° F. this catalyst was reactivated by heating in air to 750° F., cooling to 200° F. and reducing with hydrogen at 900° F. for two hours. A run was then made at 900° F. on the same stock with the same ratio of gasoline to hydrogen. A 13.1% conversion to aromatics was initially obtained and after five hours the conversion had dropped to 9.6%.

After a seven hours run at 900° F. a catalyst was again reactivated as above described and similarly run at 950° F. An initial conversion to aromatics of 27.4% was obtained, and after a seven hours run the conversion had dropped to 10.5%.

*Catalyst 2.*—187.6 grams of $Al(NO_3)_3.9H_2O$ was dissolved in 16,000 ml. of distilled water and heated to boiling. 140 ml. of concentrated ammonium hydroxide was then added slowly and the precipitant subsequently washed by decantation. 60.4 grams of $Cu(NO_3)_2.3H_2O$ and 6.5 grams of $Ba(NO_3)_2$ were dissolved in a small volume of water and added to the washed aluminum hydroxide precipitate, the total volume of the mixture being finally adjusted to 3000 ml. with distilled water. 35 ml. of concentrated ammonium hydroxide was added to this mixture and the precipitate then washed and dried as described above.

The catalyst was then placed in a furnace in an atmosphere of hydrogen and gradually raised to 950° F., which conditions were then maintained for three hours. Following this reduction and dehydration a run was made at 950° F. using the same gasoline stock and conditions as described in connection with Catalyst 1. A 6.1% conversion to aromatics was initially obtained and after five hours the conversion rose to 7.1%. The catalyst was then reactivated and run at 1000° F. under similar conditions. An initial conversion to aromatics at 1000° F. of 13.5% was obtained. After five hours the conversion was still 13.5%. After six hours the catalyst was again reactivated and again run at 1000° F. An initial conversion to aromatics of 14.4% was obtained which dropped off to 12.5% after five hours.

Another sample of the same catalyst was gradually brought up to 850° F. in a stream of hydrogen. When a temperature of 850° F. was obtained the gas stream was switched from hydrogen to isobutane. 7½% of the isobutane was converted into isobutylene when using a contact time of about one second. The degree of conversion slowly dropped off with use, but could be restored by reactivation with oxygen or air.

*Catalyst 3.*—138 grams of $Th(NO_3)_4.4H_2O$ was dissolved in 11000 ml. of distilled water and thorium hydroxide precipitated by the addition of a slight excess of 9% ammonia solution. The material was thoroughly washed and 60.4 grams of $Cu(NO_3)_2.3H_2O$ and 6.5 grams of $Ba(NO_3)_2$ added, the volume of the mixture being made up to 2500 ml. The mixture was heated to boiling and a very slight excess of 9% ammonia solution was added. The resultant precipitate was washed and dried in the usual manner. This catalyst was also active in reactions such as described above.

Our work indicates that the advantage in this thorium-copper catalyst is in the substantial freedom of the products from unsaturates rather than in any high rate of conversion, inasmuch as the conversion rates so far obtained with this catalyst have been lower than with the other catalysts. Therefore its value lies also in the purity of its products.

In preparing catalysts of this type the metal in the gel distender for the copper oxide is taken preferably from the class consisting of aluminum, zirconium and thorium as a preferred group, and titanium, hafnium, tantalum and columbium as a second group. The gels of these materials, particularly when prepared by dehydration of the hydroxide, all constitute distenders suitable for this invention. From the standpoint of rate of conversion, cost and ease of handling, zirconium is the most preferred, aluminum being also very desirable from the standpoint of efficiency and cost. While materials of the second group may be employed, they are nevertheless considered of secondary importance, at least so far as our work has extended, and also since most of them are too costly.

In using in these catalysts the third constituent which we have termed an activating or promoting agent, such as barium oxide, it may well be that the function thereof is one of preventing the copper oxide from being rapidly and completely reduced to copper, in which state the catalyst tends to break down and become largely ineffective. For use as such promoter or activator or protector or stabilizer, barium oxide has been found to be a particularly valuable and efficient agent, but the oxides of the other alkaline earth metals, calcium, strontium, and magnesium, may also be used. Oxides of a few other metals may be employed for this promoting or stabilizing function. These metals also apparently are required to possess definitely basic characteristics, and include cadmium, cerium and thorium oxides. The class of promoting or stabilizing oxides for this purpose consists of the oxides of all of the definitely basic elements of groups II and IV of Mendeleeff's system. Thus, the class of such basic metals is composed of the alkaline earth metals, barium, calcium, strontium and magnesium in group II, and in addition cadmium of group II and cerium and thorium of group IV. All of these elements of groups II and IV may be classed as definitely basic. It is to be noted that when thorium is employed in gel form as a distender, it is used in much larger proportions and in a physical condition different from its condition when employed as a promoter or protector for the copper oxide in which condition the thorium is deposited upon the distender (e. g. zirconium oxide gel), as by precipitation or by adsorption from solution of a water-soluble thorium salt, with eventual formation of oxide in the distender. While the other promoters or stabilizers in the indicated class are useful, at least for many purposes, nevertheless we have found barium to possess outstanding value as an individual metal whose compounds are to be used; and as a specific group the alkaline earth metals, namely barium, calcium, strontium and magnesium are the preferred group whose compounds are to be employed as promoters or stabilizers.

The relative proportions of the components are not important, provided that sufficient of the distender be present to insure the proper physical structure. In general, active catalysts can be prepared using 20 to 90 mol percent of the distender oxide and from about 10 to 70 mol percent of copper oxide and from about 1% to 15% of the promoter oxide. We prefer, however, to use catalysts containing from 20 to 50 mol percent of copper oxide. In using these catalysts for the vapor phase dehydrogenation or reforming of hydrocarbons the illustrated use of hydrogen as a carrier gas is not essential. The carrier gas may be entirely dispensed with if its function is not desired, or a completely inert gas such as nitrogen, entirely free from oxygen, sulfur or the like, may be used. The volume ratio of the carrier gas to the hydrocarbon vapor may vary from a small fraction to several fold. We find in general, however, that the use of a carrier gas in reforming or in dehydrogenation of the heavier hydrocarbons results in larger conversions.

The reactivation of the catalyst following prolonged use is made necessary by the accumulation of tars or carbonaceous materials on the surface of the catalyst which impair its efficiency. These materials may be removed by any oxidizing process such as contacting the catalyst with air or oxygen containing gases at elevated temperatures. It is preferable but not necessary to subject the reactivated catalyst to reduction with hydrogen before again using it in the dehydrogenation reaction.

While the catalytic conversion of hydrocarbons induced by the catalysts is primarily that of dehydrogenation there is some evidence to the effect that in the reforming of gasoline hydrocarbons other types of reactions may occur. Thus, in some instances, a greater yield of aromatics is observed than corresponds to the cyclohexane hydrocarbons present in the feed, thus indicating a molecular rearrangement of cyclopentanes, or ring closure of paraffines. In speaking of the catalyst as a reforming catalyst, therefore, a broader concept is involved than simply that of dehydrogenation.

Referring in greater detail to the different types of materials which may be modified through the medium of the indicated catalysts, one aspect of particular industrial importance is the dehydrogenation of the low boiling or normally gaseous paraffinic hydrocarbons heavier than methane which may be transformed into corresponding mono-olefines to provide unsaturated starting materials which can be converted by synthesis into a variety of chemicals or into polymer or synthetic gasolines and lubricating oils. Also, any hydrocarbon capable of being vaporized and dehydrogenated may be so heat-treated in gaseous or vaporous form in the presence of these catalysts, including not only gaseous and liquid hydrocarbons above but also solid aliphatic hydrocarbons, naphthenic hydrocarbons especially naphthenic 6-membered rings, and in general other petroleum fractions.

As to the gaseous hydrocarbons mentioned, these include ethane, propane, butane, iso-butane, the pentanes, the hexanes and the like, which include the corresponding iso compounds and mixtures thereof which may be obtained by absorption, distillation or other means, and may or may not be de-sulfurized according as their sulfur content may make necessary or desirable. If refinery gases and the like already contain unsaturates, they will be removed ordinarily by preliminary treatment if in appreciable quantity, thereby to obtain a direct supply of the unsaturates and also to reduce a tendency to deposit tar on the catalysts.

In treating normally liquid materials, as well as normally gaseous materials, it is preferable to work in the gaseous or vaporous state and to bring the gases and vapors up to the reacting temperature or somewhat above in order to supply part of the heat necessary in the subsequent endothermic reaction. This avoids cooling of the catalytic material which also should be heated to the reaction temperature required. In general operation, the heated gaseous or vaporous hydrocarbons will be intimately contacted with the surfaces of the heated catalyst as by passing of the hot vapors or gases through packed bodies of granular or pellet-like catalyst particles. The catalyst may also be commingled as a dust. Contact times may range from one-fifth of a second to five or ten seconds, according to requirements for sufficient but not excessive time to accomplish the desired conversions. Unreacted materials may be recycled. In general, operations may be conducted preferably at about atmospheric pressure. Obviously it is preferable to employ vessels constructed of non-catalytic material, for example stainless steel alloy tubes containing 18% nickel and 8% chromium which is substantially non-catalytic, or silicious or ceramic, or coated tubes and vessels.

With respect to temperatures of operation, these in general will lie between about 850° F. and 1100° F. for the treatment of both true gases and vapors of heavier materials, regardless of whether these treatments be for purposes of mere dehydrogenation or for more complex conversions such as reforming hereinafter more fully described. Obviously the temperature in any given instance should be high enough to correspond to a substantial equilibrium concentration of the desired product, but should not be so high as to induce side reactions or to injure the catalyst. In general the reactions at 850° F. result in low conversion and longer catalyst life, whereas increase in temperatures up toward 1100° F. in general increases the rate of conversion but reduces the life of the catalyst. For practical operations, we find that in general the process is advantageously operated to give a 10% to 40% conversion per pass. With the catalysts used in the present invention, equilibrium conditions whereby maximum conversion is obtained are reached in a very brief interval of time, that is, within a few seconds as distinguished from the much longer time, for example sixty seconds or more, and higher temperatures required without the catalyst. Thus, when employing a contact time of about one second and with catalysts herein described, we have obtained at 850° F. a 15% to 17% conversion of isobutane to isobutylene as compared with the theoretical 18%. Considerable variation in choice of temperature is admissible; for example isobutane may be dehydrogenated to give substantial yields of iso-butene at temperatures from about 800° F. upward to about 1000° F., and temperatures approaching 1100° F. may be employed provided the contact time is exceedingly short.

When dehydrogenating the normally gaseous hydrocarbons, they are heated to a reacting temperature and then passed through suitable non-catalytic vessels, such as tubes previously indicated, containing spaced heated catalytic beds, the gases being reheated as they pass from one conversion bed to the next. Or the gases may be treated in kindred apparatus. Upon removal from the system, the unsaturates in the treated gases may be converted to gasoline fractions by polymerization and the gasoline fractions may be separated from the gases by condensation, the unconverted hydrocarbon (for example butane) being fractionated to free it from hydrogen and returned to the dehydrogenation unit.

In using hydrous oxide-copper oxide catalysts hereof in catalytic reforming of gasoline, previously mentioned, their importance resides in the improvement in knock rating for motor fuels. With respect to the term "reforming," while such operations are essentially the same as those of the above described dehydrogenation processes, the term also possesses a further significance. In addition to dehydrogenation of saturated hydrocarbons to produce olefines or the conversion of cyclo-hexane and its derivatives to aromatics, "reforming" includes other and different reactions. While these are complex reactions, we find indications of molecular re-arrangements of the types that lead to the production of aromatics from cyclo-pentane hydrocarbons and also other evidence indicating that alkylation, ring closure and other types of reactions are taking place. In any event the final effect of reforming is to increase the knock rating of gasolines.

Various types of stocks are suitable for these reforming processes provided they contain substantial amounts of hydrocarbons within the gasoline boiling range. Heavier boiling fractions such as crude gasoline are eminently suited to reforming. While the process is operable on any otherwise suitable petroleum fractions, the highest knock ratings are obtained when working on petroleum fractions containing substantial percentages of naphthene hydrocarbons. In carrying on a reforming process according to the present invention, the procedure is very much like that described for the dehydrogenation of a normally gaseous hydrocarbon. The stock may be heated under pressure and flashed, or otherwise vaporized, and then commingled if desired with an inert carrier gas, or the carrier gas may be introduced into the flashing unit, as at the bottom where it may exercise a stripping action on the unvaporized hydrocarbons. The commingled vapors and carrier gas are heated to reacting temperature or somewhat above and passed through apparatus containing catalyst beds such as previously indicated in connection with dehydrogenation processes. The reforming reactions are, like the reaction of dehydrogenation, endothermic, and it is necessary to supply the heat of reaction by heating the catalyst or by providing heating surfaces between the catalyst beds or by reheating the gases between a series of converters, or by recycling unconverted materials through a single converter and providing a heating step in said recycle, or by other suitable means.

Contact times of ½ to 10 seconds are suitable in that they effect the desired increase in knock rating; normally a contact time of 3 seconds is sufficient. In order to avoid complex apparatus, it is preferable to work at atmospheric pressure but sub-atmospheric or super-atmospheric pressures may be used, if desired.

Temperatures from 850° F. to 1100° F. are suitable for reforming in the presence of hydrous oxide-copper oxide catalysts. There is but little or no reforming effected by temperatures below 750° F., while temperatures in excess of 1100° F. tend to damage the catalyst. The exit gases from the reforming unit are preferably passed in heat exchange relationship with incoming feed and then condensed to recover the reformed gasoline. The uncondensed gases are then compressed and fractionally distilled to recover on the one hand a fraction comprising hydrogen and methane which fraction, if desired, may be recycled as carrier gas and on the other hand a fraction comprising saturated and unsaturated hydrocarbons containing from 2 to 4 carbon atoms. The unsaturates present in this latter fraction may be profitably polymerized to yield gasoline or used for other purposes. The condensate as produced is a high knock rating gasoline, and depending upon the character of the stock and the degree of reforming may or may not require redistillation and a nominal treatment to give gasoline of the desired boiling range, color and stability. Suitable treatments for this condensate, designed to improve the color and stability are vapor phase treatment with adsorptive clay or vapor phase treatment with concentrated zinc chloride solution, both of which vapor phase treatments may, if desired be made on the uncondensed gases and vapors in the form in which they leave the catalytic reforming unit, or the condensate may receive a light treatment with sulfuric acid or similar reagent.

A gasoline stock of the following characteristics was catalytically reformed with procedure and equipment indicated:

Engler °F.:
    Initial_____ 168.
    50%_____ 264.
    Dry point_____ 370.
Gravity_____ 56.1° A. P. I.
Hydrocarbon composition:
    Unsaturates_____ 0%.
    Aromatics_____ 1%.
    Naphthenes_____ 47%.
    Paraffines_____ 52%.
Percent sulfur_____ 0.003%.
Refractive index $nD$_____ 1.4155.
Knock rating_____ 50.

A hydrous aluminum oxide-copper oxide catalyst was used at a temperature of 950° F. and two volumes of hydrogen was used as carrier gas per unit volume of gasoline vapor. A sample of the total gasoline reformed in the first 5 hours of operations showed the following characteristics:

Engler °F.:
    Initial_____ 145.
    50%_____ 254.
    Dry point_____ 400.
Gravity_____ 51.5° A. P. I.
Hydrocarbon composition:
    Aromatics plus unsaturates___ 33.1%.
    Naphthene_____ 35.9%.
    Paraffines_____ 31.0%.
Percent sulfur_____ 0.003%.
Refractive index $nD$_____ 1.4295.
Knock rating_____ 75.

The condensate contained but little di-olefines and was, therefore, relatively stable in spite of its substantial content of mono-olefines. The substantial increase in knock rating may be due, in part, at least, to the increase in content of unsaturates and aromatics although as previously noted, there have been indications that reactions such as molecular rearrangement, ring closure, alkylation and the like are involved. However, it is not desired to be bound by any theory as to the precise reactions responsible for the increase in knock rating.

Samples taken during the run showed an initial conversion to aromatics of 29.3 percent which gradually decreased to a value of 11.4 percent at the end of the five hour period. The catalyst was then blown with flue gas to which gradually increasing amounts of air were added for 4 hours at the end of which period undiluted air was being used and regeneration of the catalyst was shown by the absence of carbon dioxide in the effluent gases. Following the regeneration the catalyst was contacted with a stream of hydrogen at the same temperature, namely 950° F. for a period of two hours and then switched back into reforming use with the result that again an initial conversion of 29.3 percent was obtained.

In commercial production, it is advisable to have several catalytic reforming units, the majority of which are kept on-stream while the remainder are regenerated in order to provide for a continuous operation of the process.

As previously stated, the process may be used to dehydrogenate any hydrocarbon capable of being vaporized and susceptible to dehydrogenation. For example, methyl cyclo-hexane was dehydrogenated to toluene obtaining an initial conversion of 45% at 900° F. and three seconds contact time over a copper oxide-hydrous oxide catalyst. At 950° F. an 80 percent conversion to toluene was initially obtained.

In another instance paraffin wax was melted and vaporized by passing a stream of methane through the molten wax. The commingled methane and wax vapors were brought to 850° F. and passed at that temperature over a hydrous oxide-copper oxide catalyst. The condensate obtained from the exit gases and vapors was found to contain 40% of mono-olefines of approximately the same molecular weight as the original saturated wax.

The carrier gels of the metals here described are to be distinguished from the jelly type of the so-called silica gels which are precipitated with acids, whereas the present gels are precipitated with alkalies and also possess otherwise different characteristics.

In the preparation of these catalysts it is highly preferable that the gel contain substantially no electrolytes which will not reduce to metal oxides in a final dehydration and reduction prior to use of the catalyst, inasmuch as such electrolytes have been found to damage the catalyst and detract from its activity. This condition may be obtained, for example, by washing out substantially all the water soluble reaction products produced by metathesis of the metal salts and the precipitants. Similarly, where a water-soluble salt is to be adsorbed on the gel, it should be one which will readily reduce to an oxide at the temperatures and conditions employed in preparation, for example, a nitrate.

Also, where a basic oxide, such as an alkali metal oxide, or an alkaline earth metal oxide, or the like, is employed as a promotor or is otherwise present, water-soluble salts of such metals should not remain in greater amounts than necessary to yield the desired amounts of oxide, that is, a preferred maximum of about 5% and preferably not over about 2% oxide.

Also, it is to be understood that, in addition to dehydrogenation and reforming, these catalysts may be used in the reverse or hydrogenation reactions by choice of suitable thermodynamic conditions, the catalysts being correspondingly effective in the hydrogenation of unsaturated hydrocarbons or aromatics. For these purposes, for example, temperatures may be employed between 200° F. and 1000° F. so long as equilibrium conditions and temperatures high enough to activate the catalysts are maintained. Therefore, the invention extends also to use of the present catalysts for both hydrogenation and dehydrogenation, during which the carbon-hydrogen ratio is changed.

The examples and illustrations here given are intended to be illustrative only and it is understood that they introduce no limitations not required by the restrictions of the prior art.

We claim:

1. A process for the dehydrogenation of non-benzenoid hydrocarbons heavier than methane which includes the step of contacting the hydrocarbon gases or vapors at an elevated temperature with a non-siliceous catalyst comprising copper oxide, a metal oxide gel, and an oxide of a basic metal of groups II and IV of the periodic system.

2. A process for the reforming of gasoline and similar hydrocarbons which includes the step of contacting such hydrocarbon vapors at an elevated temperature with a non-siliceous catalyst comprising copper oxide, a difficulty reducible metal oxide gel, and oxide of a basic metal of Groups II and IV of the periodic system.

3. A process for the conversion of hydrocarbons comprising subjecting hydrocarbon vapors or gases to the action at elevated temperatures of a non-siliceous catalyst comprising oxide gel from the class of metals whose oxides are difficultly reducible, the gel containing copper oxide and an oxide of a basic metal from groups II and IV of the periodic system.

4. A process according to claim 3 wherein the basic metal oxide is barium oxide.

5. A method for changing the carbon-hydrogen ratio of hydrocarbons which comprises subjecting hydrocarbon gases or vapors heavier than methane to a conversion temperature in the presence of a non-siliceous catalyst comprising a difficultly reducible, hard, porous, hydrous metal oxide gel containing copper oxide, the catalyst being substantially free from salts and containing an oxide promoter of a basic metal of groups II and IV of the periodic system.

6. A method for the dehydogenation of hydrocarbons comprising subjecting hydrocarbon gases or vapors to heat above about 750° F. in the presence of a non-siliceous catalyst comprising copper oxide and a difficultly reducible hydrous metal oxide gel obtained by partial dehydration of a precipitated hydroxide at less than white heat and a basic metal oxide stabilizer.

7. A method for thermally changing the carbon-hydrogen ratio of hydrocarbons comprising subjecting hydrocarbon gases or vapors at a conversion temperature to the influence of a non-siliceous catalyst comprising copper oxide on a hydrous oxide gel from a metal of the class whose oxides are difficultly reducible, and an oxide of a basic metal as a stabilizer.

8. A method for the dehydrogenation of normally gaseous hydrocarbons heavier than methane which comprises subjecting said hydrocarbons to a conversion temperature in the presence of a non-siliceous hard, porous, difficultly reducible, hydrous metal oxide gel containing copper oxide, and an oxide of a basic metal.

9. A method for reforming gasoline and similar hydrocarbons comprising subjecting such hydrocarbon vapors to a conversion temperature in the presence of a non-siliceous catalyst consisting of copper oxide and a difficultly reducible, hard, porous, hydrous metal oxide gel, and an alkaline earth metal oxide.

10. A method according to claim 3 wherein the gel is a hydrous oxide of zirconium.

11. A method according to claim 3 in which the hydrocarbon gases or vapors are borne in hydrogen as a carrier gas.

12. A method according to claim 3 wherein the gel is a hydrous oxide gel of aluminum.

13. A method according to claim 3 wherein the gel is a hydrous oxide gel of thorium.

WILLIAM E. BRADLEY.
JOHN L. VOLZ.